G. L. HERZ.
PUMP.
APPLICATION FILED JAN. 27, 1908.

918,319.

Patented Apr. 13, 1909.

Witnesses
Phil E. Barnes
R. C. Braddock

Inventor
Gustave L. Herz
By William W. Dyane
his Attorney

UNITED STATES PATENT OFFICE.

GUSTAVE L. HERZ, OF NEW YORK, N. Y.

PUMP.

No. 918,319.     Specification of Letters Patent.     Patented April 13, 1909.

Application filed January 27, 1908. Serial No. 412,904.

*To all whom it may concern:*

Be it known that I, GUSTAVE L. HERZ, a citizen of the Empire of Austria-Hungary, residing at New York, in the county of New York and State of New York, have invented certain new and useful Improvements in Pumps, of which the following is a specification.

My invention has to do with pumps; and it seeks the provision of a practical and efficient pump constructed with a view of being applied and held under pressure against a fly wheel or other rotating part of a gasolene engine or other motor and of being actuated by the friction due to the said pressure between it and the said fly wheel or other rotating part.

To the attainment of the foregoing object, my invention consists in the peculiar and advantageous pump hereinafter described and particularly pointed out in the claims appended.

Figure 1:
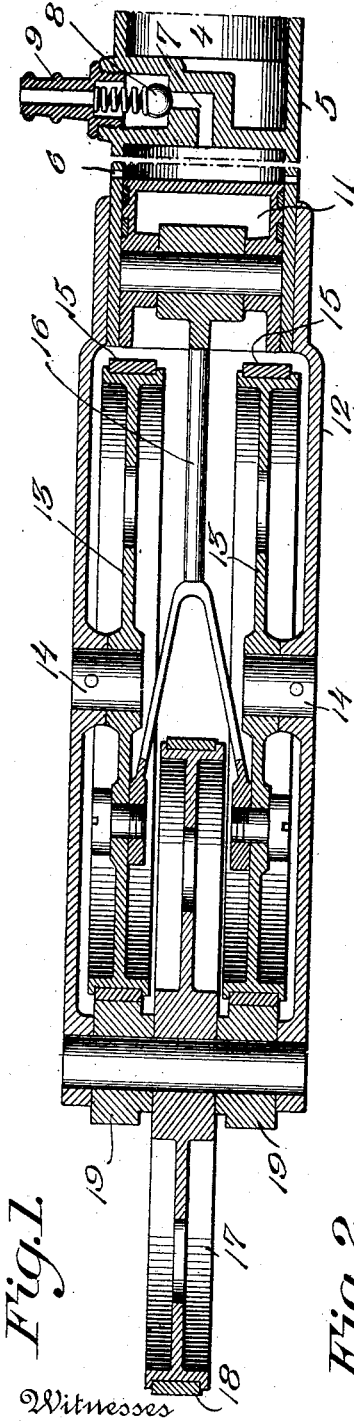
Figure 2:
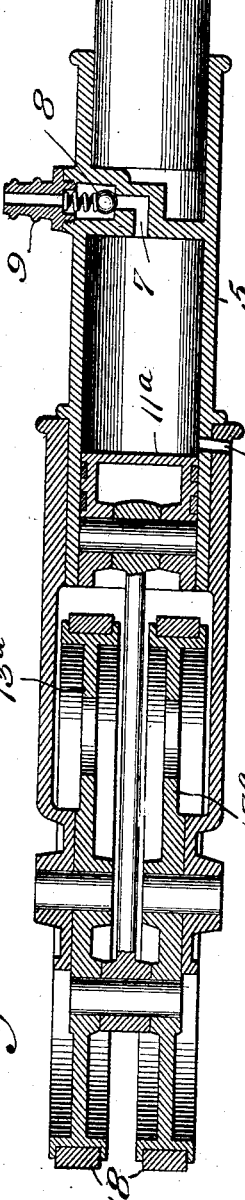

In the drawings accompanying and forming part of this specification: Figure 1 is a longitudinal section of a portion of a pump of the chracter mentioned constituting the most approved, practical embodiment of my invention of which I am cognizant: Fig. 2, a modification of the same, and Fig. 3, a view illustrative of the manner in which the pump is arranged relative to the fly wheel or other rotating part of a gasolene engine or other motor when it is desired to operate the pump by the fly wheel or other rotating part.

Figure 3:
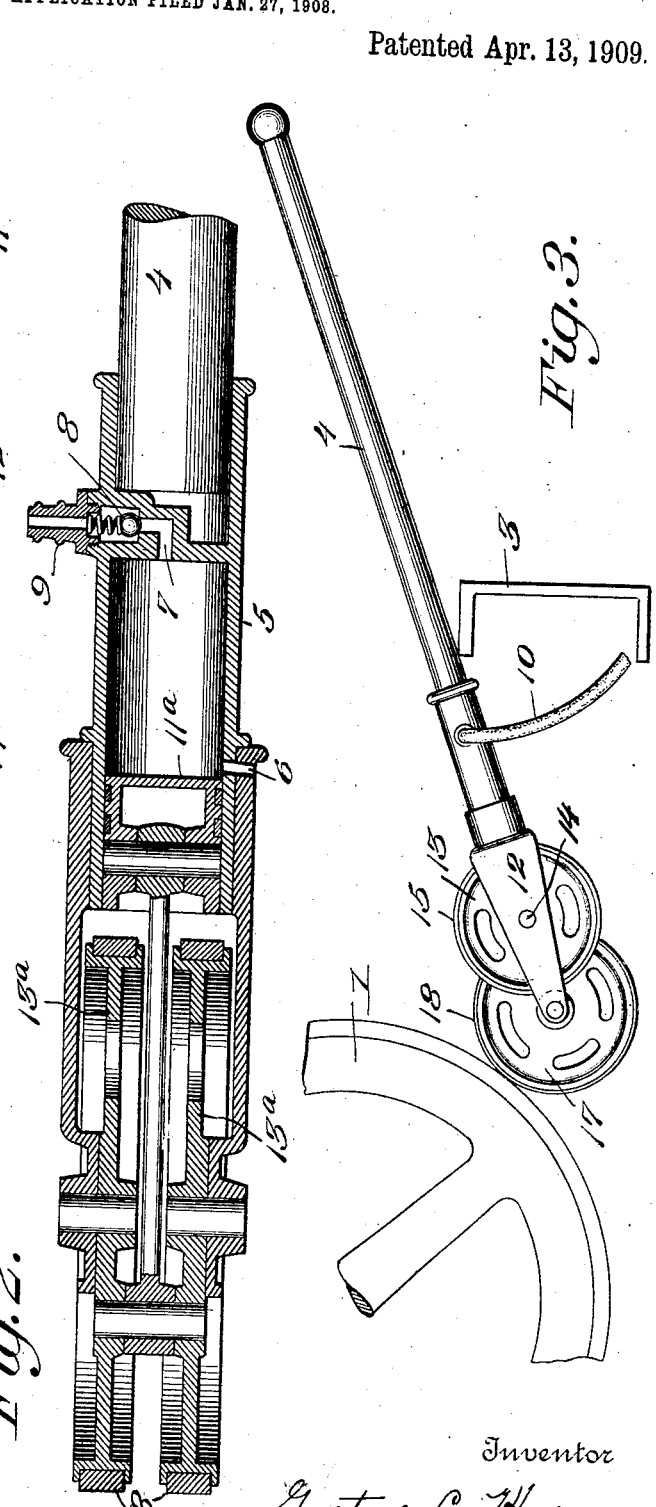

Referring by numeral to the said drawings and more particularly to Figs. 1 and 3, thereof: 1 represents a portion of a fly wheel of an engine or motor, and 2 is my novel pump as a whole; the latter being, by preference, of the hand lever type, and being designed to be fulcrumed on an engine frame portion 3 or other support suitable to the purpose, after the manner shown in Fig. 3.

I prefer in practice for reasons which will be understood to have my novel pump comprise a handle bar 4 which for the sake of lightness is made of wood, a cylinder 5, of suitable metal, rigidly connected to the handle bar and having an induction orifice 6 for air or other fluid and an eduction orifice 7 controlled by a check-valve 8 and communicating with a nipple 9 designed for the connection of a hose 10 or the like, a rectilinearly movable piston 11 disposed in the cylinder 5, a bifurcated or fork-like frame 12 arranged on and fixed with respect to the cylinder 5, crank wheels 13 mounted on journals 14 connected to the sides of the frame 12 and having rims 15, formed of cork or other friction-creating material compatible with the purpose of my invention, a pitman 16 interposed between and connected to the crank wheels 13 and the piston 11 and having for its office the usual one of converting the rotary motion of the wheels to reciprocatory motion appropriate to the operation of the piston, a wheel 17 mounted to rotate between the sides of the frame 12 and also between the outer portions of the crank wheels 13 and having a friction-creating rim 18 of rubber or other material suitable to the purpose, and annular devices 19 disposed at opposite sides of and fixed with respect to the wheel 17 and frictionally engaged with the rims 15 of the crank wheels 13, the said devices 19 being, by preference, knurled metal wheels.

It will be readily understood from the foregoing and by reference to Figs. 1 and 3 that when the pump is positioned as shown in the latter figure, relative to the fly wheel or other rotary and power-driven element and the support 3, and downward pressure is exerted on the handle bar 4 of the pump, the rim 18 of the wheel 17 will be held in frictional contact with the wheel 1 and consequently the wheel 17, the annular devices 19 and the crank wheels 13 will be rotated, and the piston 11 will be reciprocated to draw air or other fluid into the cylinder 5 through the orifice or port 6 and force the said air or other fluid under pressure from the cylinder through the valve-controlled orifice or port 7. It will also be understood that incidental to the operation of the pump by the fly wheel or rotary element 1, the annular devices 19 by reason of their interposition between the power-receiving wheel 17 and the crank wheels 13 will reduce the speed of the rotary elements of the pump and in that way preclude reciprocation of the piston 11 at an unduly high rate of speed. When it is desired to stop the operation of the pump, the operator has but to relieve the handle bar 4 of downward pressure whereupon the wheel end of the pump will gravitate away from the fly wheel 1.

It will be gathered from the foregoing that by virtue of the provision of my novel pump, the power expended in driving a fly wheel or other rotary portion of a motor may be utilized to store air or other fluid under pressure or to force such fluid to a point of use, and this with practically no effort on the part of the person using the pump; and it will also be noted that the pump is simple and strong in construction, and hence well adapted to withstand the rough usage to which devices used for automobiles are ordinarily subjected.

The modified construction of pump illustrated in Fig. 2 is a simplification of that shown in Figs. 1 and 3 in that the crank wheels 13ᵃ connected with and arranged to reciprocate the piston 11ᵃ are designed to be utilized for application to the fly wheel 1, and the wheel 17 and its appurtenant annular devices 19 of the embodiment shown in Figs. 1 and 3 are omitted. In the said modified construction no provision is made for reducing the speed during the transmission of motion to the piston 11ᵃ and from this it follows that the modification is designed for use in combination with a fly wheel or other rotary part that is driven at a comparatively low rate of speed.

I have entered into a detailed description of the construction and relative arrangement of parts comprised in the present embodiments of my invention with a view of imparting a full, clear and exact understanding of the said embodiments, but I would have it understood that in the future practice of the invention such changes in structure may be made as fairly fall within the scope of my invention as defined in the claims appended.

Having described my invention, what I claim and desire to secure by Letters Patent, is:

1. A combined pump and hand lever arranged to be fulcrumed at an intermediate point of its length and comprising a handle bar, a cylinder fixed to and forming a continuation of the handle bar, a piston movable in the cylinder, a wheel connected with and carried by the cylinder and arranged to be engaged, by manipulation of the combined pump and lever, with and derive motion from a rotating part of a motor, and a driving connection intermediate said wheel and the piston for actuating the latter by the former.

2. A combined pump and hand lever arranged to be fulcrumed at an intermediate point of its length and comprising a handle bar, a cylinder fixed to and forming a continuation of the handle bar, a piston movable in the cylinder, means connected with and carried by the cylinder and arranged to be engaged, by manipulation of the combined pump and lever, with and derive motion from a moving part of a motor, and means intermediate the first named means and the piston for actuating the latter by the former.

3. A combined pump and hand lever arranged to be fulcrumed at an intermediate point of its length and comprising a handle bar, a cylinder fixed to and forming a continuation of the handle bar, a piston movable in the cylinder, means connected with and carried by the cylinder and arranged to be engaged, by manipulation of the combined pump and lever, with and derive motion from a moving part of a motor, and means intermediate the first named means and the piston for actuating the latter by the former; the second named means including means for reducing the speed of the piston as compared to that of the first named means.

4. A combined pump and hand lever arranged to be fulcrumed at an intermediate point of its length and comprising a handle bar, a cylinder fixed to and forming a continuation of the handle bar, a piston movable in the cylinder, a wheel connected with and carried by the cylinder and arranged to be engaged, by the manipulation of the combined pump and lever, with and derive motion from a rotating part of a motor, and a driving connection intermediate said wheel and the piston for actuating the latter by the former; the said driving connection including means for reducing the speed of the piston as compared to that of the said wheel.

5. A pump adapted to be operated in the manner set forth, comprising a cylinder having induction and eduction orifices, a piston movable in the cylinder, a bifurcated frame fixed with respect to and extending forward from the cylinder, a handle bar fixed with respect to and extending rearward from the cylinder, a wheel mounted in the frame and adapted to be frictionally engaged with and to derive motion from a rotating part of a motor, and a driving connection intermediate the wheel and the piston for actuating the latter by the former.

6. A pump adapted to be operated in the manner set forth, comprising a cylinder having induction and eduction orifices, a piston movable in the cylinder, a bifurcated frame fixed with respect to and extending forward from the cylinder, a handle bar fixed with respect to and extending rearward from the cylinder, a wheel mounted in the frame and adapted to be frictionally engaged with and to derive motion from a rotating part of a motor, a second wheel mounted in the frame, a driving connection intermediate the second mentioned wheel and the piston for actuating the latter by the former, and a gear fixed with respect to the first mentioned wheel and engaging the second mentioned wheel for reducing the speed of the latter wheel as compared with that of the former wheel.

7. A combined pump and hand lever arranged to be fulcrumed at an intermediate point of its length and comprising a handle bar, a cylinder fixed to and forming a continuation of the handle bar, a piston movable in the cylinder, a wheel connected with and carried by the cylinder and arranged to be engaged, by manipulation of the combined pump and lever, with and derive motion from a rotating part of a motor, a second wheel connected with and carried by the cylinder, a driving connection intermediate the second mentioned wheel and the piston for actuating the latter by the former, and a wheel fixed with respect to the first mentioned wheel and engaging the second mentioned wheel for reducing the speed of the latter wheel as compared with that of the first mentioned wheel.

In testimony whereof I affix my signature in presence of two witnesses.

GUSTAVE L. HERZ.

Witnesses:
   LOUIS HOFFMAN,
   L. M. HAUTH.